United States Patent [19]

Gagnon et al.

[11] Patent Number: 5,305,496

[45] Date of Patent: Apr. 26, 1994

[54] SHOCK AND VIBRATION ISOLATING CASTER

[75] Inventors: Paul R. Gagnon, Acton; David F. Cerqua, Maynard, both of Mass.

[73] Assignee: Applied Power Inc., Butler, Wis.

[21] Appl. No.: 987,861

[22] Filed: Dec. 9, 1992

[51] Int. Cl.⁵ .............................................. A47B 91/00
[52] U.S. Cl. ............................................ 16/44; 16/47
[58] Field of Search ....................................... 16/44, 47

[56] References Cited

U.S. PATENT DOCUMENTS

| | | | |
|---|---|---|---|
| 2,543,948 | 3/1951 | Wiedman | 16/44 |
| 2,581,912 | 1/1952 | Brown | 267/21 |
| 4,312,096 | 1/1982 | Schubert et al. | 16/44 |
| 4,649,595 | 3/1987 | Shane | 16/44 |

FOREIGN PATENT DOCUMENTS

| | | | |
|---|---|---|---|
| 491364 | 8/1938 | United Kingdom | 16/44 |
| 582371 | 11/1946 | United Kingdom | 16/44 |

*Primary Examiner*—John Sipos
*Assistant Examiner*—Carmine Cuda
*Attorney, Agent, or Firm*—Quarles & Brady

[57] ABSTRACT

A caster has two spaced apart wheels with an elastomeric torsional shock and vibration isolating suspension between them. The wheel axis is spaced longitudinally from a bearing axis to subject elastomeric disks positioned between the wheels to torsional shear stresses to help absorb shocks and vibrations. A snubber is provided for limiting the angular motion of the wheels about a bearing axis.

14 Claims, 4 Drawing Sheets

SHOCK AND VIBRATION ISOLATING CASTER

FIELD OF THE INVENTION

This invention relates to casters, and in particular to casters having elastomeric shock and vibration isolation elements.

DISCUSSION OF THE PRIOR ART

Casters having elastomeric torsion elements for absorbing shocks and vibrations are known, for example, from U.S. Pat. No. 4,312,096. In these casters, a yoke shaped bearing support is secured to the structure to be mounted on casters, a pair of wheel supports rotatably mounts a wheel between them, and an elastomeric torsion element is bonded between the bearing support and the wheel supports. The wheel supports are rotatable relative to the bearing support about an axis which is longitudinally offset from the wheel axis so that vertical loads applied to the wheel subject the elastomeric element to torsional shear stresses.

With these types of casters, for any given wheel diameter, the height of the caster itself has in some cases been excessive. The overall height of the caster has been reduced by increasing the angle between the bearing axis and the wheel axis (as measured from a vertical line through and below the bearing axis), but this results in a relatively long caster and high preloading forces being applied to the elastomeric torsion element, since for a large angle a significant proportion of the static weight load must be borne by the torsional resistance of the elastomeric element. In addition, when subjecting the elastomeric element to high and continuous torsional loads, it is possible that the bonds between the element and the wheel support and bearing support may fail or that the element itself may shear and therefore cause the caster to collapse. In addition, these types of casters had a relatively narrow stance, which resulted in instability in some applications.

SUMMARY OF THE INVENTION

The invention provides a caster which overcomes the above shortcomings of the prior art. In a caster of the invention, two spaced apart wheels are provided with a shock and vibration isolation suspension utilizing elastomeric torsional spring/damper elements disposed inboard of the wheels. This results in a low profile wheel of a short length and with a wide and stable stance. It also allows a relatively small angle between the wheel axis and the bearing axis to reduce the torsional static and dynamic loads to which the elastomeric element is subjected. In addition, in a preferred aspect, a fail-safe snubber can be provided on the bearing support to arrest excessive upward travel of the wheel relative to the bearing support.

In a preferred form, a wheel support is provided for each wheel with the wheel supports disposed inboard of the wheels along the wheel axis. A wheel axle, which may be provided as a single shaft or multiple coaxial shafts, extends through the wheel supports, and rotatably mounts the wheels to rotate about the wheel axis. An elastomeric torsion element for each wheel support, for a total of two in the preferred embodiment, are disposed inboard of the wheels along the wheel axis and each is bonded on one side to a corresponding wheel support and on the other side to a bearing support which is inboard of the wheels. A pivot bearing having a bearing axis which is parallel to the wheel axis extends through the wheel supports, the torsion elements and the bearing support, and allows rotation of the wheel supports relative to the bearing support about the pivot bearing axis. Means are also provided for mounting the bearing support to a structure to be supported by the caster. In an especially useful form, each of the elastomeric torsion elements is disposed inboard of its corresponding wheel support and the bearing support is arranged inboard of the elastomeric torsion elements along the wheel axis.

Preferably, the bearing support provides a snubbing bumper for abutting the axle at an upper limit of rotation of the wheel supports relative to the bearing support. This arrests excessive angular motion of the wheel supports and makes the caster fail-safe. In one form, the wheel axle is a single shaft which extends between the wheels and through slots in the bearing support, which provides limits for the upward as well as the downward rotation of the wheel supports.

Other features and advantages of the invention will be apparent from the following detailed description and from the drawings.

DETAILED DESCRIPTION OF THE PREFERRED EMBODIMENT

Figure 1:
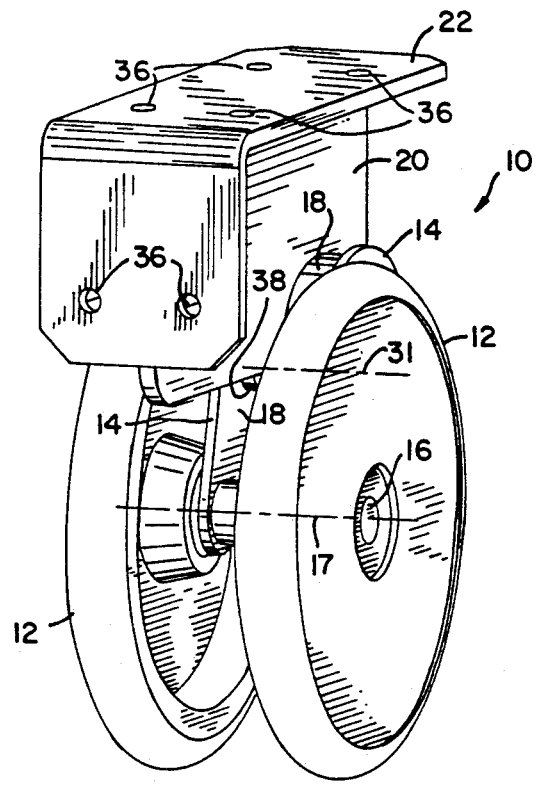
FIG. 1 is a perspective view of a caster of the invention.
Figure 2:
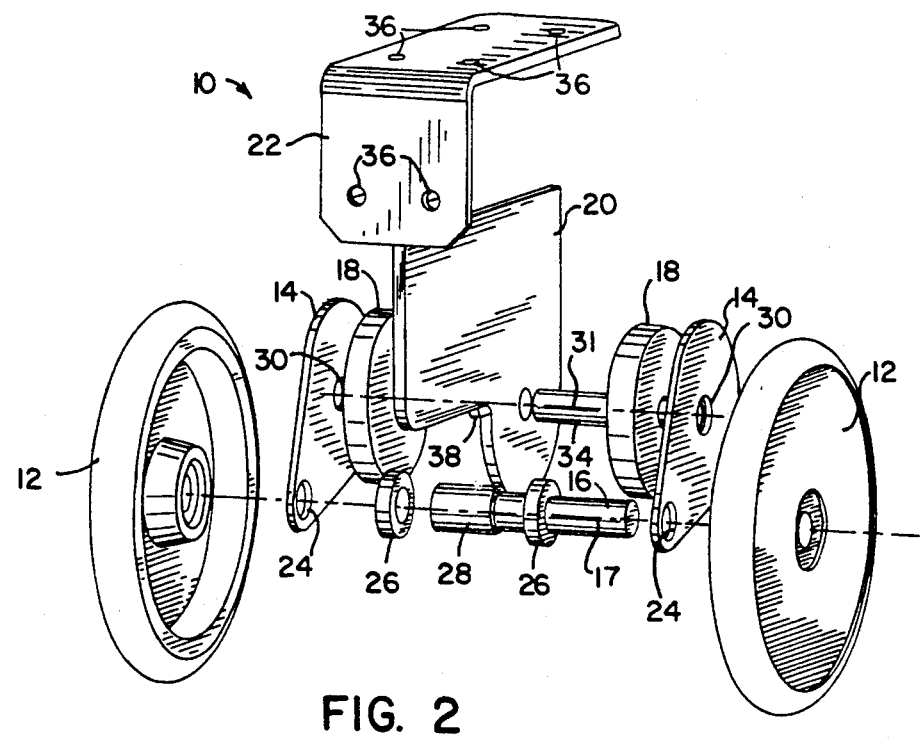
FIG. 2 is an exploded perspective view of the caster of FIG. 1.

FIGS. 1 and 2 illustrate a caster 10 of the invention having a pair of spaced apart wheels 12, a pair of wheel supports 14, an axle 16 spanning the wheels 12 and having an axis 17, elastomeric torsion elements 18, a bearing support 20 and a bearing support mount 22.

Each wheel support 14 is preferably a steel plate, as is the bearing support 20. The mount 22 is also a steel plate bent at a right angle and welded or otherwise secured to the bearing support 20 so as to hold the bearing support 20 in a generally vertical plane.

Figure 5:
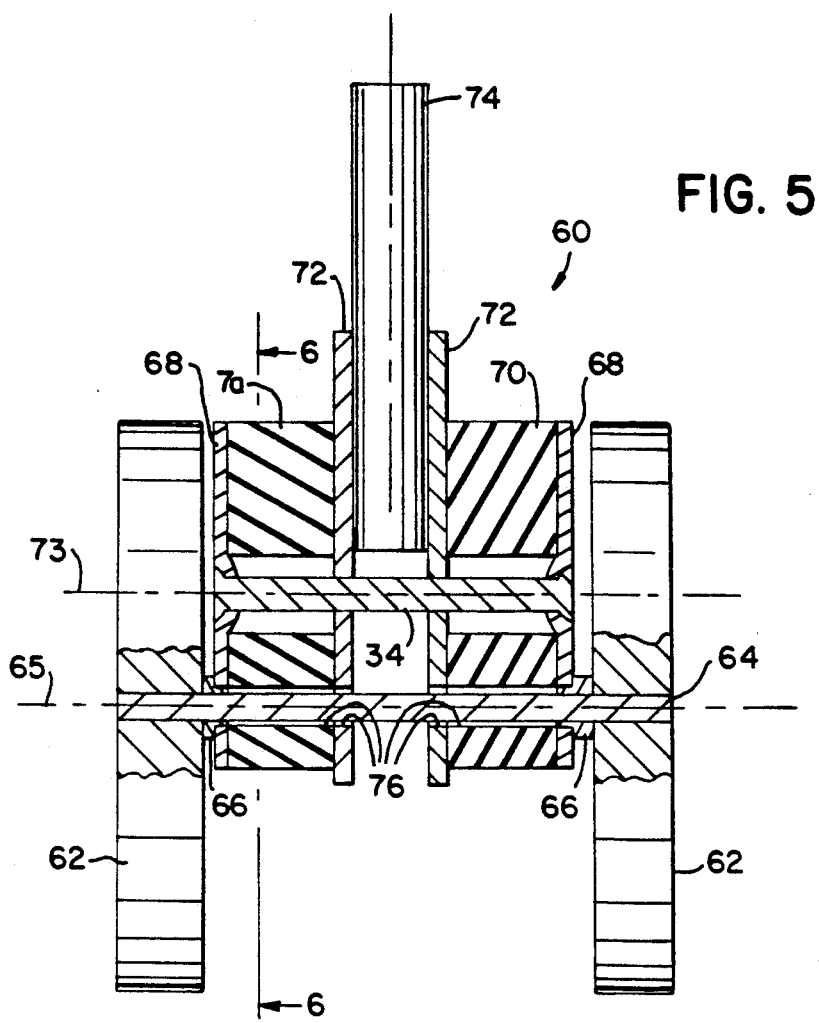
FIG. 5 is a sectional view of a third embodiment of a caster of the invention.

The axle 16 in the caster 10 is provided as a single axle which spans the wheels 12 and is secured at its ends to each wheel 12 by a press fit, adhesive or other suitable means so that the axle 16 and the wheels 12 rotate together about wheel axis 17. The wheel supports 14 each have a hole 24 through which the axle 16 extends and the axle 16, being a live axle, is journaled in the holes 24. Suitable anti-friction journal bearings may be provided in the holes 24 which may also help space the wheels 12 from the adjacent wheel supports (as shown in FIG. 5) if desired.

The axle 16 also preferably extends through spacers 26 and 28 which are disposed between the wheel supports 14 and serve to maintain the spacing between the wheel supports 14. The wheel supports 14 are generally tear-drop shaped with the holes 24 spaced apart from holes 30 at the center of the round portion of each support 14. Holes 30 are aligned axially along bearing axis 31. The inboard surface of the round portion of each wheel support 14 is bonded, such as by adhesive, vulcanizing or any other suitable means, to the outboard surface of a disk 32 made of an elastomeric material. The inboard surfaces of the disks 32 are bonded by similar means to opposite side surfaces of the bearing support 20. A pivot bearing 34 in the shape of a circular shaft extends through the holes 30, through the disks 32 and through the bearing support 20, and is secured at its ends to the supports 14 by welding, swaging, a C or E clip or other suitable means. In any event, the pivot bearing 34 allows the wheel supports to rotate relative to the bearing support 20 about the axis of the pivot bearing 34. The mount 22 is fixed to the bearing support 20 and has holes 36 for securing the mount 22 to a structure to be supported by the caster 10 such as a cart, bed, chair or other structure.

The caster 10 also includes a snubber 38 provided on the bearing support 20 to abut spacer 28 at the upper limit of rotation of the wheel supports 14 relative to the bearing support 20. Such abutment may occur, for example, if one or more of the bonds between the disks 18 and the bearing support 20 or wheel supports 14 failed or if any unusually large shock were encountered by the caster. In either event, this snubber 38 would arrest movement of the wheels 12 upwardly when the spacer 28 abutted the snubber 38. Preferably, the snubber 38 is provided as a small piece of elastomer to act as a cushion, although it could be made of metal and an integral part of the bearing support 20.

Figure 3:
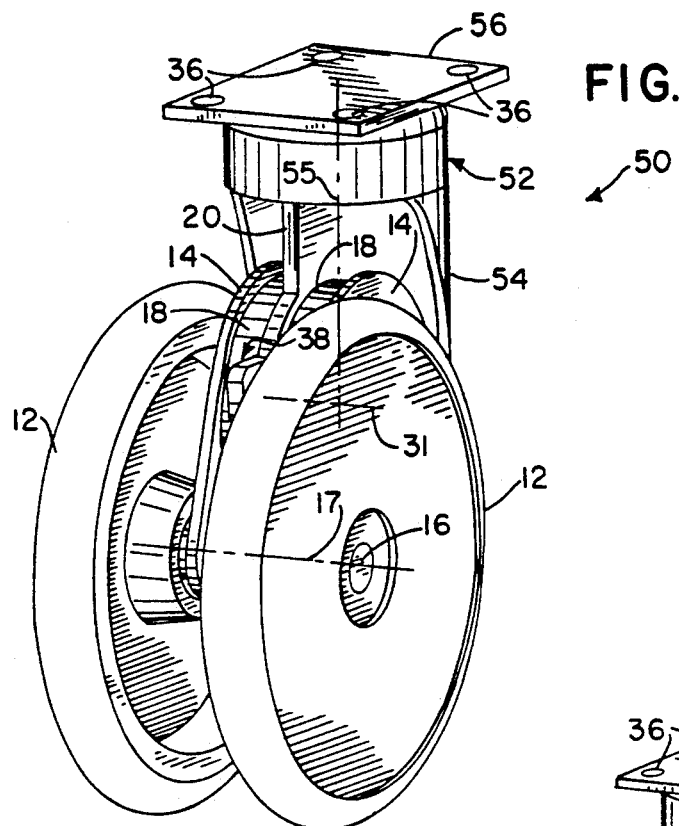
FIG. 3 is a perspective view of a second embodiment of a caster of the invention.
Figure 4:
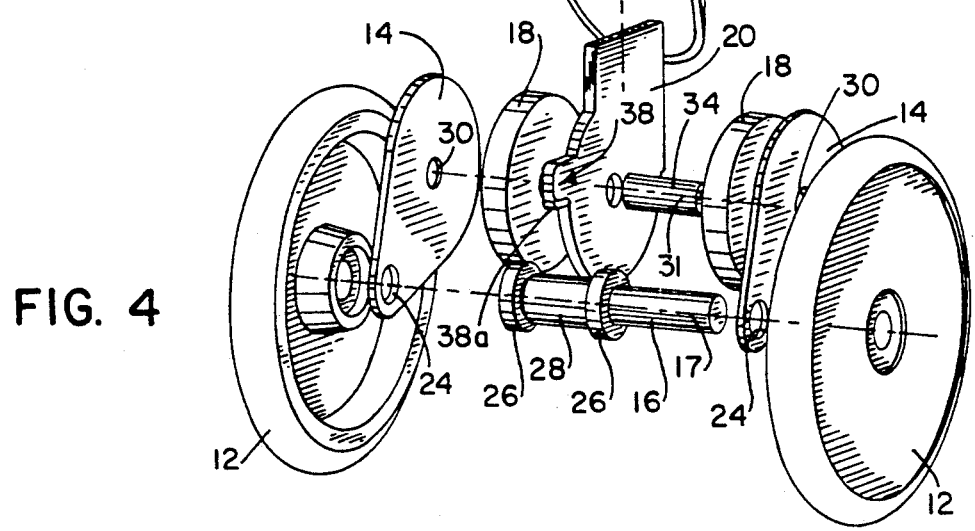
FIG. 4 is an exploded perspective view of the caster of FIG. 3.

FIGS. 3 and 4 show a second embodiment 50 of a caster of the invention which is constructed essentially the same as the caster 10 but is provided with a swivel mount 52 rather than a fixed mount 22 as in the caster 10. Bearing support 20 is welded or otherwise secured along its top and front edges to lower portion 54 of swivel mount 52 and upper portion 56 of swivel mount 52 is secured to the cart, bed, chair or other structure to which the caster is to be mounted. The lower portion 54 can swivel about a vertical axis 55 relative to the upper portion 56 to facilitate turning and maneuvering the structure mounted on the caster 50.

The swivel mount 52 may be of the well known ball bearing type or any other type which provides for rotation of the lower portion 54 relative to the upper portion 56. Other elements of the caster 50 corresponding to elements of the caster 10 have been numbered with the same numbers. It is noted that in the snubber 38 of the caster 50, a separate elastomeric pad 38a is provided to cushion abutment with the spacer 28.

Figure 6:
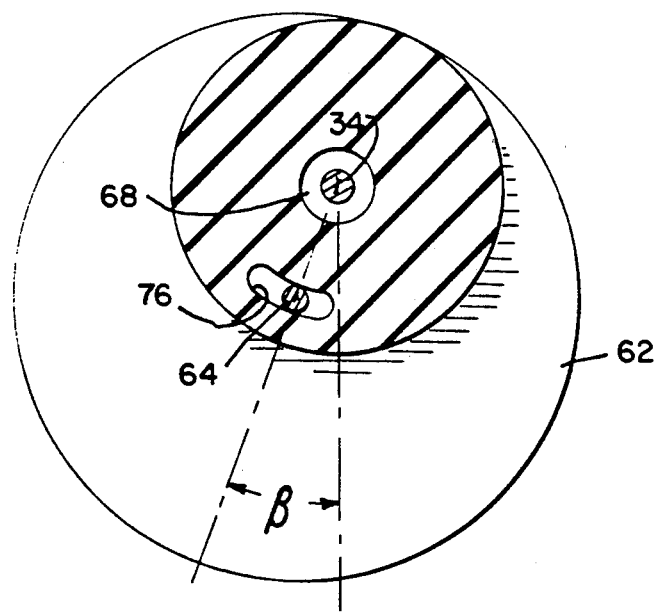
FIG. 6 is a sectional view taken along the plane of the line 6—6 of FIG. 5.

FIGS. 5 and 6 illustrate a third embodiment 60 of a caster of the invention. In the caster 60, a pair of wheels 62 are provided with a live axle 64 between them. The axle 64 is journaled to rotate about axis 65 in bearings 66 which are inserted in holes of wheel support plates 68 and have flanges to space the wheels 12 from the plates 68. The axle 64 extends through aligned arcuate slots 76 formed in elastomeric torsion disks 70 and plates 72.

In the caster 60, the plates 72 are secured by welding or other suitable means to a mounting stem 74, but instead of a mounting stem a fixed plate (like mount 22 in FIGS. 1 and 2) or a swivel mount (like mount 52 in FIGS. 3 and 4) could be fixed to the plates 72. The mounting stem 74 is inserted up into a hole of the structure to which the caster 60 is to be mounted, in well known fashion.

Both plates 72 make up a bearing support which is bonded to the inboard side surfaces of the elastomeric torsion disks 70. The outboard side surfaces of the disks 70 are each bonded to the inboard side surface of the adjacent plate 68. A pivot bearing 34 is secured at its ends to the plates 68 and extends through the disks 70 and the plates 72 to allow rotation of the plates 68 relative to the plates 72 about bearing axis 73.

Referring to FIG. 6, the slots 76 are centered on the axis 73 as shown. The wheel axle 64 rides in the slots 76 and the slots 76 provide an upper limit at their top ends and a lower limit at their bottom ends for the rotation of the plates 68 relative to the plates 72. These limits serve to arrest excessive rotation of the plates 68 relative to the plates 72, much in the same manner as the snubber 38, although in the caster 60, snubbing is provided at both the upper and the lower limits of angular motion. It should also be noted in the caster 60, with particular reference to FIG. 6, that a relatively small angle $\beta$ exists between the wheel axle and the pivot bearing.

Figure 9:
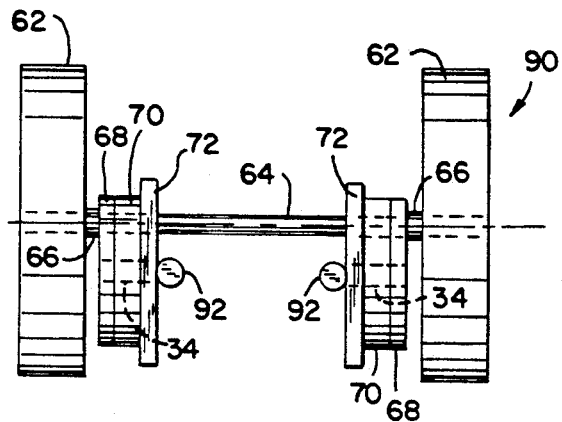
FIG. 9 is a top plan view of the caster of FIG. 7.
Figure 8:
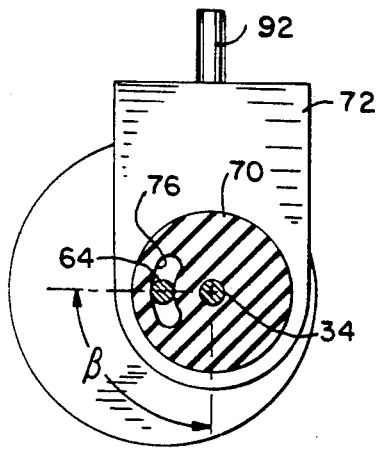
FIG. 8 is a side elevational view of the caster of FIG. 7.
Figure 7:
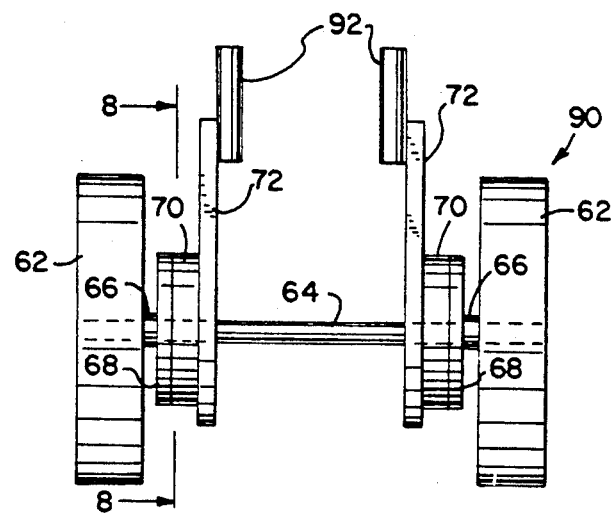
FIG. 7 is a front plan view of a fourth embodiment of a caster of the invention.

FIGS. 7-9 illustrate a fourth embodiment 90 of a caster of the invention. The caster 90 is similar to the caster 60 except that the plates 72 are spaced further apart, a separate stem 92 is provided for each plate 72, and the pivot bearing 34 is provided in two separate shafts, one at each side of the caster. Note that the axle 64 could also be provided in two separate shafts, if so desired. In the embodiment 90, each stem 92 may be disposed at opposite sides of the structure to be supported by the caster 90, such as at opposite side legs of a cart. Also, as best shown in FIG. 8, the angle $\beta$ is approximately 90°. This angle would yield high torsional loading of the elements 70 relative to a smaller angle for any given vertical load, such as the weight of a cart or other structure supported by the caster 90. However, because of the relatively compact size in which a caster of the invention may be made, and therefore a relatively short distance between the pivot bearing 34 and the axle 64, the torsional loads on the disk 70 would not necessarily be excessive, depending upon the cart or other structure supported by the caster 90.

Preferred embodiments of the invention have been described in considerable detail. Many modifications and variations will be apparent to those skilled in the art which will still embody the invention. For example, it may be possible to incorporate the invention in another type of two-wheeled caster such as one having a brake or other accessories, or in a caster in which the wheel axle was not live. Therefore, the invention should not be limited to the preferred embodiment, but should be defined by the claims which follow.

We claim:

1. A shock and vibration isolating caster, comprising:
    at least two floor engagement wheels, said wheels being spaced apart along a wheel axis;
    a wheel support for each said wheel, said wheel supports being disposed inboard of said wheels along said wheel axis;
    an axle extending through said wheel supports, coaxial with said wheel axis and mounting said wheels to said wheel supports to rotate about said wheel axis;
    an elastomeric torsion element for each said wheel support, each said element being disposed inboard of said wheels along said wheel axis and each said element being bonded on a side thereof to a corresponding wheel support with a clearance between each said element and said axle so as to allow rotation of said axle about a bearing axis which is parallel to said wheel axis;

a bearing support inboard of said wheels along said wheel axis and bonded to said torsion elements on sides of said elements opposite from said wheel supports;

a pivot bearing coaxial with said bearing axis, said pivot bearing extending through said wheel supports, said torsion elements and said bearing support, said pivot bearing allowing rotation of said wheel supports relative to said bearing support about said bearing axis; and means for mounting said bearing support to a structure to be supported by said caster;

wherein said elastomeric torsion elements flex in torsion to allow rotation of said axle about said bearing axis.

2. A caster as in claim 1, wherein each of said elastomeric torsion elements is disposed inboard of its corresponding wheel support along the wheel axis.

3. A caster as in claim 2, wherein said bearing support is arranged inboard of said elastomeric torsion elements along the wheel axis.

4. A caster as in claim 1, wherein said bearing support provides a snubbing bumper for abutting said axle at an upper limit of rotation of said wheel supports relative to said bearing support.

5. A caster as in claim 1, wherein said axle is a single shaft which extends between said wheels.

6. A caster as in claim 5, wherein said axle extends through one or more slots in said bearing support.

7. A caster as in claim 5, wherein said axle extends through slots in said elastomeric torsion elements.

8. A caster as in claim 5, further comprising spacers on said axle between said wheel supports.

9. A caster as in claim 1, wherein said bearing support is a plate having opposed sides, with one of said torsion elements bonded to one of said sides and the other of said torsion elements bonded to the other said side.

10. A caster as in claim 1, wherein said bearing support mounting means includes at least two mounts for securing said caster to said structure, said mounts being spaced apart along the wheel axis.

11. A caster as in claim 10, wherein said pivot bearing includes two spaced-apart coaxial shafts, one of said shafts being associated with each said mount.

12. A caster as in claim 1, wherein said bearing support mounting means includes a swivel mount.

13. A caster as in claim 1, wherein said bearing support mounting means includes a fixed mount.

14. A caster as in claim 1, wherein said pivot bearing is a single shaft which extends between said torsion elements.

* * * * *